April 17, 1962 C. LORENZ 3,030,150
WAGON DUMP
Filed July 20, 1960 2 Sheets-Sheet 2
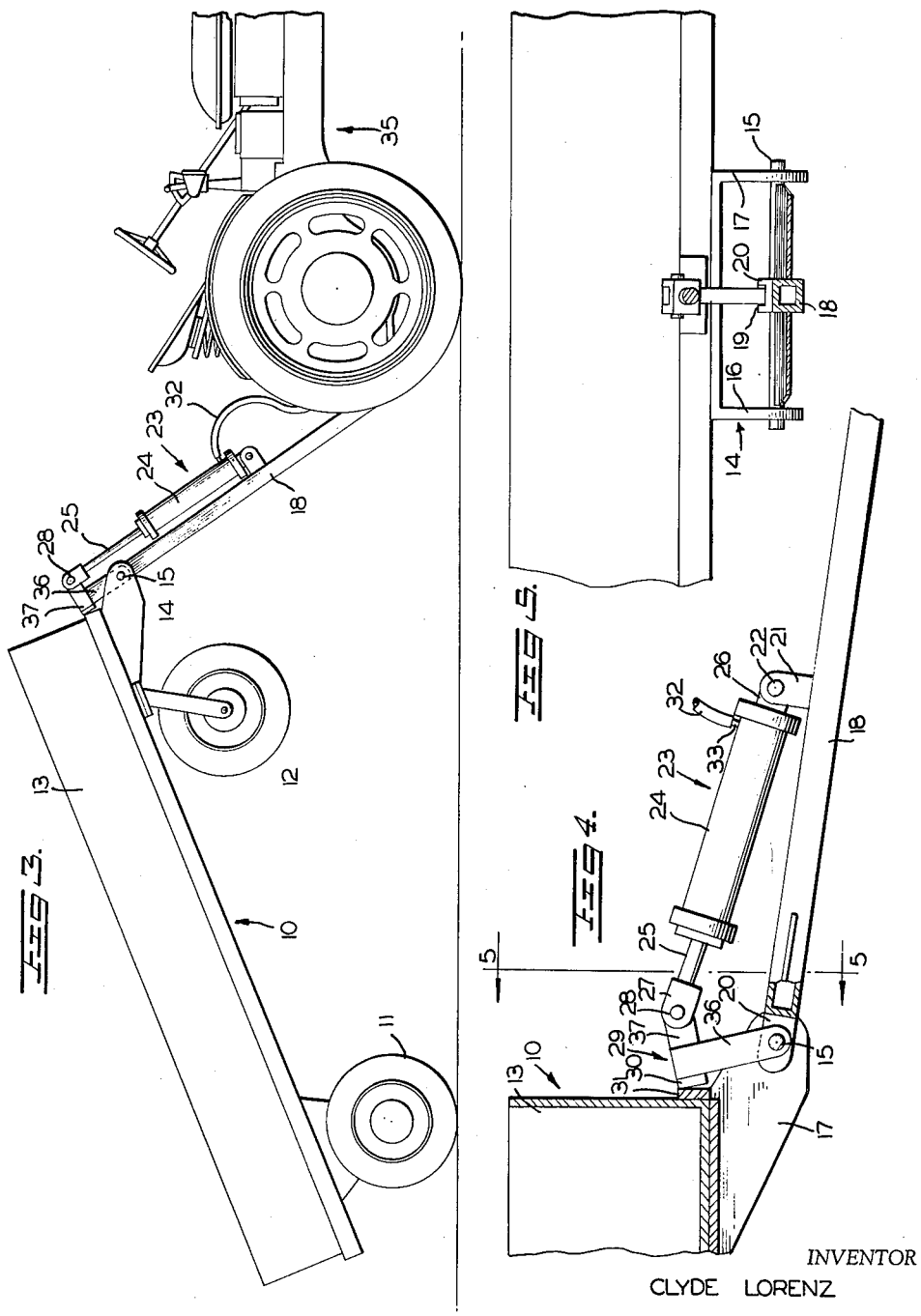
INVENTOR
CLYDE LORENZ
BY Lowell & Henderson
ATTORNEY

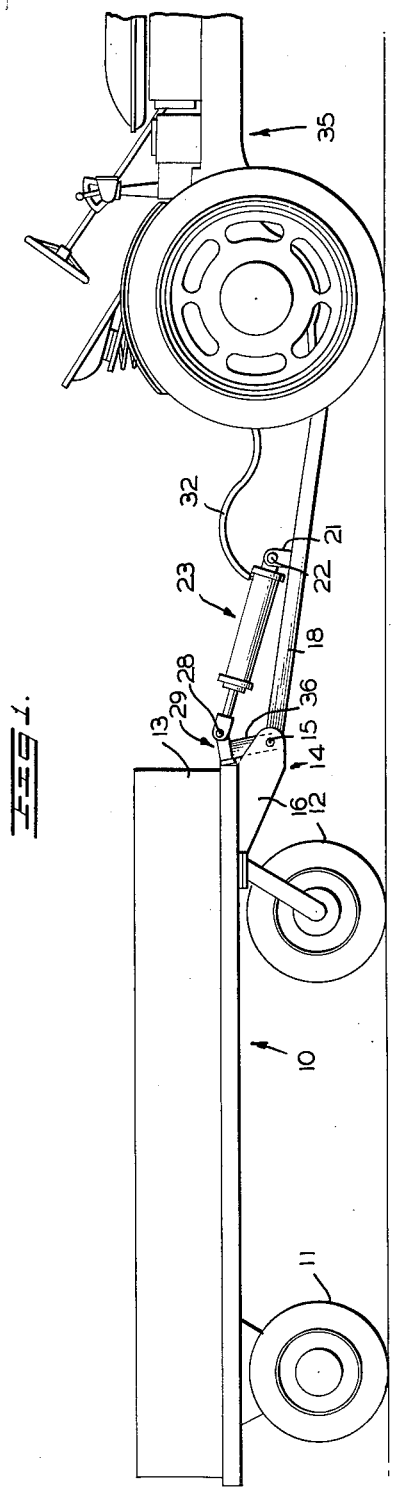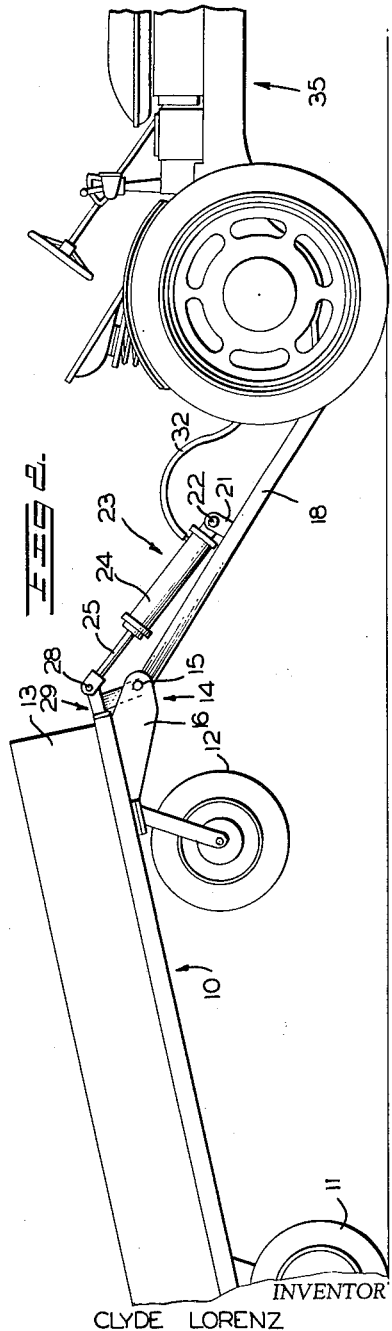
INVENTOR
CLYDE LORENZ
BY Lowell + Henderson
ATTORNEY

United States Patent Office 3,030,150
Patented Apr. 17, 1962

3,030,150
WAGON DUMP
Clyde Lorenz, 12910 W. 92nd St., Lenexa, Kans.
Filed July 20, 1960, Ser. No. 44,159
3 Claims. (Cl. 298—22)

This invention relates to farm wagons and more specifically to power means connected with the tow bar of such wagons for tilting the entire wagon as desired for dumping a load carried thereby.

The primary object of this invention is to provide a simplified power operator connected with a non-steerable tongue of a farm wagon whereby the angular relationship between the tongue and the wagon in the vertical plane may be varied to cause the wagon to tilt about the pivot between the tongue and the wagon to dump a load carried by the wagon.

A further object of this invention is to provide a farm wagon with a non-steerable tongue for connection to a traction vehicle, wherein the tongue is provided with a power cylinder which under fluid pressure from a fluid power source on a traction vehicle may act to vary the vertical angular relationship between the wagon and the tongue to cause the wagon to tilt and dump a load carried thereby.

Another object of this invention is to provide a power dumping assembly for farm wagons having castored front wheels and a non-steerable tongue which includes a power cylinder pivotally carried on the tongue for displacing a piston about a moment arm into engagement with the front end of the wagon, whereby on extension of the piston, the farm wagon at the forward end will be raised to thereby tilt the wagon to a dumping attitude.

With the foregoing and other objects in view, this invention resides in the following specification and appended claims, certain embodiments and details of construction of which are illustrated in the accompanying drawings, in which:

FIGURE 1 is a view in side elevation of the invention as applied to the tongue of a farm wagon hitched to a tractor illustrated in fragmentary form;

FIGURE 2 is a view in side elevation similar to FIGURE 1 but illustrating the invention in operating condition with the farm wagon being partially tilted upwardly;

FIGURE 3 is a view similar to FIGURE 2 but illustrating the invention at the upper limit of its operation corresponding to maximum tilt for the farm wagon;

FIGURE 4 is an enlarged, fragmentary, partially sectioned view in side elevation of the power actuating unit comprising the invention as applied to the forward end of a farm wagon, and FIGURE 5 is a fragmentary view taken along the lines 5—5 of FIGURE 4.

Referring more particularly now to the drawings, a farm wagon generally indicated at 10 is supported by rear wheels 11 and castored front wheels 12. Extending downwardly and forwardly from a rigid connection with the body 13 of the wagon is a mounting bracket 14 (FIG. 5) which carries a horizontal pivot pin 15 between spaced arms 16 and 17 thereof. A wagon tongue 18, having a pair of spaced rearwardly directed arms 19 and 20, is pivotally secured to the pivot pin 15 for movement in the vertical plane about said pivot. The spaced arms 19 and 20 of the tongue 18 are tapped to provide holes whereby the pivot pin may be extended through said arms 19 and 20 to provide a free rotary bearing connection with the tongue 18. The other end of the tongue 18 is connected by a suitable hitch means (not shown) to the rear of a tractor 35, the connection being such as to restrict the movement of the tongue 18 relative to the tractor to that of the vertical plane.

Connected, as by welding, to the top surface of the tongue 18 is a bracket 21 through which is directed a pivot pin 22. A power unit or actuator assembly 23, including a fluid power cylinder 24 and an extensible piston rod assembly 25, is connected by means of a bracket 26 for pivotal movement about the pivot pin 22. The piston rod assembly 25 is provided with a forwardly extending bracket 27 which is provided with a pivot pin 28. Secured about the pivot pin 15 at one end and about the pivot pin 28 at its other end is a crank arm member 29 having a bearing pad 30 which as illustrated in FIGURE 4 is in engagement with the forward portion 31 of the wagon 10 on initial actuation of the power unit 23 to lift the wagon. A hose member 32 interconnects an inlet 33 of the fluid power cylinder 24 with a source of fluid (not shown) under pressure on the traction vehicle 35. During a normal transport of the wagon 10, and with the power unit 23 fully retracted, the bearing plate 30 on the arm member 29 is spaced forwardly from and out of engagement with the wagon forward portion 31.

Now with specific reference to FIGURE 1, it will be readily obvious that in a wagon lifting operation the crank arm 29 is initially positioned relative to the tongue 18 about the pivot 15 such that the arm 36 of the crank is substantially vertical. In this initial position of the crank arm 29 the wagon 10 will have both sets of wheels on the ground. Upon a continued application of force through the power unit 23 under the pressure of fluid delivered thereto through the hose 32 a force will be created between the pivot points 22 and 28 whereby the bearing plate 30 will be forced into engagement with the forward portion 31 of the wagon. Since the applied force between the points 22 and 28 is directed in a plane spaced above the plane of the axis of pivot 15, then a component of the force which is substantially entirely rearwardly directed will be created which will be a force in the vertical direction. In other words, there will be a component of force which will lift the forward wheels 12 of the wagon 10 off of the ground as the force created by the power unit 23 attempts to move the wagon counterclockwise about the axis of pivot 15. Since the rear wheels 11 of the wagon 10 are in engagement with the ground, it is quite obvious that the wagon cannot move counterclockwise. Therefore, the forward end of the wagon will rise under the compulsion of the created vertical force component. Since the tongue cannot move laterally, then the wagon cannot move laterally relative to the tongue nor can the tongue move laterally relative to the traction vehicle 35. Therefore, all force components on the wagon will have a tendency to lift the forward end of the wagon. The effect of the force on the wagon will become greater as the wagon begins to lift upwardly since the included angle between the arm 37 of the crank 29 and the piston rod 25 will be decreasing. In effect, therefore, the wagon tongue will be going upwardly along with the greater inclination of the wagon 10, and hence the more direct will be the force of the piston upon the under and forward side of the wagon to tilt the same to the position as shown in FIGURE 2.

When the arm member 36 of the crank 29 becomes aligned with the tongue 18, as shown in FIGURE 3, the wagon will have been tilted to substantially the maximum position. The actual limit of tilt may be determined by stops not shown or by the structural spacing of the piston rod relative to the upper surface of the tongue. In other words, as illustrated in FIGURE 4, there is a considerable included angle between the upper surface of the tongue 18 and the piston rod 25. However, as the wagon approaches the position illustrated in FIGURE 3, the angle between the rod and the tongue has substantially been reduced to zero, so that the force created by the pressure of the fluid in the cylinder 24 on the piston (not shown) therein is substantially parallel to the tongue and actually the tongue and crank member 36 will become incapable of exerting any further lifting force on the wagon. Further application of force past this point would result in damage to either the tongue 18 or the power unit assembly 23.

The advantage of this vehicle tilting mechanism should be readily apparent to one skilled in the art. The operator of the traction vehicle 35 may take a load of material from one area on a farm to another and dump the same without necessitating the manual effort of leaving the traction vehicle to jack up the farm wagon by prior known conventional means. Thus the invention achieves a physical as well as economical saving to the farmer.

By virtue of the crank arm member 29, during a normal wagon towing operation, being in a position spaced forwardly from the wagon portion 31, the tongue 18 and bracket 14 are relatively movable about the shaft 15 to accommodate travel of the tractor 35 and wagon 10 over an uneven ground surface.

Obvious modifications to the structural details described and illustrated in this application and set forth in the appended claims are deemed to be within the spirit and scope of such claims.

What is claimed is:

1. A dumping actuator for farm wagons of the type including a non-steerable tongue restricted to movement in the vertical plane about a horizontal pivot connection with the wagon which comprises a fluid power unit, including an extensible piston rod and a cylinder, pivotally secured at one end on said tongue, crank arm means connected about the pivot connection between the tongue and the wagon for free swinging relationship thereto, pivot means to interconnect the piston rod of said power unit to the other end of said crank arm means, and means to introduce fluid under pressure into said power unit cylinder whereby to extend said piston rod in such a manner as to force said crank arm means against the forward edge of the wagon body to establish a moment arm about the tongue pivot connection to cause said wagon body to move forwardly and upwardly as said piston rod is extended from said power unit.

2. A vehicle train including a farm wagon having a non-steerable towing tongue pivotally connected at one end to the front end of said wagon to move about a horizontal axis in the vertical plane and being attached at the other end to a traction vehicle, a fluid power unit pivotally mounted on the upper side of said tow tongue, said power unit including an extensible piston rod member, means to direct fluid from a source on said traction vehicle into said power unit, and linkage means interconnected between the horizontal pivot of said tongue means and the extremity of said piston rod means so that upon extension of the piston rod from the power unit, the wagon will be pivoted upwardly to a dumping position about its own pivot connection with the towing tongue.

3. A power dumping actuator assembly for farm wagon of the type having a tow tongue restricted to movement in the vertical plane about a horizontal pivot comprising a fluid pressure cylinder, means to pivotally secure one end of said cylinder to the upper surface of said tongue in spaced relationship to the pivot axis of the connection between the tongue and the wagon, piston rod assembly means connected with said cylinder, and linkage means, one end of said linkage means being pivotally secured about the pivot axis between the tongue and the wagon and the other end of said linkage means being pivotally secured to the end of the piston rod assembly, the arrangement of the linkage assembly being such that on extension of the piston rod assembly from the cylinder an engagement is made between the linkage and the front of the wagon whereby to establish a moment arm about the horizontal pivot of the tongue with the wagon to create an upwardly directed force component capable of lifting the forward portion of the wagon.

References Cited in the file of this patent
UNITED STATES PATENTS

| | | |
|---|---|---|
| 2,628,126 | Black | Feb. 10, 1953 |
| 2,892,659 | Francois | June 30, 1959 |